(12) United States Patent
Boguslavskij et al.

(10) Patent No.: US 9,014,407 B2
(45) Date of Patent: Apr. 21, 2015

(54) HEARING INSTRUMENT SYSTEM WITH A RECHARGEABLE BATTERY

(71) Applicants: Siemens Medical Instruments Pte. Ltd., Singapore (SG); Siemens Aktiengesellschaft, Munich (DE)

(72) Inventors: Mihail Boguslavskij, Erlangen (DE); Simon Huettinger, Erlangen (DE); Frank Koch, Erlangen (DE); Frank Naumann, Erlangen (DE); Benjamin Sewiolo, Hoechstadt (DE); Tom Weidner, Erlangen (DE)

(73) Assignees: Siemens Medical Instruments Pte. Ltd., Singapore (SG); Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/911,257

(22) Filed: Jun. 6, 2013

(65) Prior Publication Data

US 2013/0329925 A1     Dec. 12, 2013

Related U.S. Application Data

(60) Provisional application No. 61/656,062, filed on Jun. 6, 2012.

(30) Foreign Application Priority Data

Aug. 14, 2012   (DE) .................. 10 2012 214 469

(51) Int. Cl.
*H04R 25/00* (2006.01)
*H02J 7/02* (2006.01)

(52) U.S. Cl.
CPC ............... *H02J 7/025* (2013.01); *H04R 25/00* (2013.01); *H04R 2225/31* (2013.01); *H04R 25/75* (2013.01)

(58) Field of Classification Search
CPC .................................................. H04R 2225/31
USPC .................................................. 381/323, 315
See application file for complete search history.

(56) References Cited

U.S. PATENT DOCUMENTS 6,025,694 A    2/2000  Mercke et al.
6,326,884 B1  12/2001  Wohlrabe
(Continued)

FOREIGN PATENT DOCUMENTS

DE         19817273 A1   10/1999
DE      102005024227 A1   11/2006
(Continued)

OTHER PUBLICATIONS

"NTT Docomo's New Smartphone, Charger Can Be Wirelessly Charged" May 17, 2011 12:03 Kouji Kariatsumari, Nikkei Electronics http://techon.nikkeibp.co.jp/english/NEWS_EN/20110517/191823/; 2011; May 17, 2011.
(Continued)

*Primary Examiner* — Ahmad F Matar
*Assistant Examiner* — Norman Yu
(74) *Attorney, Agent, or Firm* — Laurence A. Greenberg; Werner H. Stemer; Ralph E. Locher (57) ABSTRACT

A hearing instrument system with a rechargeable battery or accumulator is optimized for everyday use, in particular for EOL detection, and the performance and service life of the accumulator. A hearing instrument, an accumulator system, and a charging system each have an energy transfer interface and a communication interface. The energy transfer interface and communication interface on the accumulator side can establish an energy transfer link and/or communication link on the charge and hearing instrument side. The accumulator system provides energy to the hearing instrument and transmits state of charge information generated by an accumulator control facility to the hearing instrument by way of the respective communication link. The transmission of the state of charge information enables a reliable state of charge detection in the case of batteries, whose state of charge cannot be identified on their voltage, for instance Li-ion systems with closed-loop controlled voltage.

9 Claims, 8 Drawing Sheets

(56) References Cited

U.S. PATENT DOCUMENTS

| | | | |
|---|---|---|---|
| 2006/0256989 A1* | 11/2006 | Olsen et al. | 381/323 |
| 2008/0089541 A1* | 4/2008 | Preves et al. | 381/323 |
| 2009/0285426 A1 | 11/2009 | Boguslavskij | |
| 2010/0098278 A1 | 4/2010 | Sorensen et al. | |
| 2010/0111340 A1 | 5/2010 | Miller et al. | |
| 2010/0320961 A1 | 12/2010 | Castillo et al. | |
| 2010/0322454 A1 | 12/2010 | Ambrose et al. | |
| 2012/0130660 A1 | 5/2012 | Neumeyer | |
| 2013/0016862 A1* | 1/2013 | Newton et al. | 381/323 |

FOREIGN PATENT DOCUMENTS

| | | | |
|---|---|---|---|
| DE | 102008022925 A1 | 6/2009 | |
| DE | 102008023352 A1 | 11/2009 | |
| DE | 102009030070 A1 | 12/2010 | |
| EP | 1727395 A2 | 11/2006 | |
| EP | 2178315 A2 | 4/2010 | |
| WO | 9823021 A2 | 5/1998 | |
| WO | 2004084582 A1 | 9/2004 | |

OTHER PUBLICATIONS

JHT Jhih hong technology Co Ltd; Wireless Battery Pack & Charger for iPhone 3G/3GS http://www.jht-energy.com/style/content/CN-09-2a/product_detail.asp?lang=2&customer_id=2255&name_id=96567&rid=56802&id=318528#iphone3G (download: Mar. 15, 2012).

Hansaton AQ 2G—Flyer; 2012.

* cited by examiner

HEARING INSTRUMENT SYSTEM WITH A RECHARGEABLE BATTERY

CROSS-REFERENCE TO RELATED APPLICATION

This application claims the priority, under 35 U.S.C. §119 (e), of provisional application No. 61/656,062 filed Jun. 6, 2012 and of German application DE 10 2012 214 469.2, filed Aug. 14, 2012; the prior application is herewith incorporated by reference in its entirety.

BACKGROUND OF THE INVENTION

Field of the Invention

The invention lies in the field of hearing instruments and relates, more particularly, to a hearing instrument system having a rechargeable battery, or accumulator.

Rechargeable batteries can be used in particular in mobile devices. Hearing instruments may be considered mobile devices. Hearing instruments can be embodied as hearing devices for instance. A hearing device, or hearing aid, is used to supply a hearing-impaired person with acoustic ambient signals, which are processed and amplified so as to compensate for and/or treat the respective hearing impairment. It consists in principle of one or a number of input transducers, a signal processing facility, an amplification facility and an output transducer. The input transducer is generally a receiving transducer, e.g. a microphone and/or an electromagnetic receiver, e.g. an induction coil. The output transducer is generally realized as an electroacoustic transducer, e.g. miniature loudspeaker, or as an electromechanical transducer, e.g. bone conduction earpiece. It is also referred to as an ear-piece or receiver. The output transducer generates output signals, which are routed to the ear of the patient and are to generate a hearing perception in the patient. The amplifier is generally integrated in the signal process facility. Power is supplied to the hearing device by means of battery integrated into the hearing device housing. The essential components of a hearing device are generally arranged on a printed circuit board as a circuit carrier and/or connected thereto.

Besides hearing devices, hearing instruments may also be embodied as so-called tinnitus maskers. Tinnitus maskers are used to treat persons that are afflicted with tinnitus. They generate acoustic output signals which are dependent on the respective hearing impairment and depending on the active principle also on ambient noises, which may contribute to reducing the perception of interfering tinnitus or other ear noises.

Hearing instruments may further also be embodied as telephones, cell phones, headsets, headphones, MP3 players or other electronic mobile telecommunication or consumer electronics devices.

Hearing instruments were previously usually operated using non-rechargeable batteries. Batteries based on zinc-air cells, which have a high energy density are frequently used. The power supply including the battery itself is integrated in the hearing instrument. The battery is covered in the hearing instrument by a door or flap and is as result shielded from the environment. The battery can be inserted and removed through the door or flap. Electrical contacts which contact the rechargeable battery are provided in the hearing instrument. These are clamped into a holder and have no fixed connection to the hearing instrument. Since this door does not however tightly close, impurities, moisture and above all also chemically aggressive earwax can enter the battery compartment and thus the hearing instrument, thereby causing corrosion or other problems there.

The battery must unfortunately be replaced often, in many cases even every few days. For older users in particular this is a problem and/or a question of user-friendliness. Work is therefore underway on rechargeable battery solutions for hearing instruments. A product with a rechargeable NiMH battery, or NiMH accumulator, is already commercially available. NiMH accumulators are advantageous in that they have the same voltage level (1.2V) as the conventional non-rechargeable batteries in hearing instruments, and that the form factor is identical. The user can thus freely choose between conventional battery and rechargeable battery. NiMH accumulators are nevertheless very disadvantageous in that they only have a relatively short service life, their capacity is limited and they react sensitively to high temperatures when being charged. On account of the cited difficulties, it must still be possible to replace the battery, which makes an openable and thus not fully sealed battery compartment necessary.

A rechargeable battery system with high energy density involves lithium ion technology. Lithium ion (abbreviated to Li-ion) batteries however react sensitively to a plurality of influences, for instance extreme temperatures, high charging temperatures, overcharging or deep discharge. Furthermore, they profit to a particular degree from suitable charge current cycles and trickle charging cycles. Li-ion batteries are therefore advantageously used with individually adjusted charging and protective circuits so as to optimize capacity and service life.

It is known from the rechargeable hearing device Hansaton® AQ to inductively charge a hearing device. The hearing device is also connected to the charging device via an IR coupling. The start and end of the charging process are controlled by way of the IR coupling so that the charging device automatically determines and/or obtains information in respect of the battery.

For everyday use, it is particularly important for the user to be informed about the remaining operating time. To this end, hearing instruments include end-of-life detection (EOL), which detects the imminent end of the battery service life and/or the imminent depletion of the battery and notifies the user thereof. With batteries, the state of charge of the battery must be determined accordingly and/or the imminent depletion of the battery charge must be identified. The EOL detection is adjusted to the currently conventional battery systems, the remaining battery service life of which is determined by the hearing instrument with the aid of the battery voltage. Other battery systems, for instance accumulators, can however exhibit a different EOL behavior, so that EOL detection is unable to function correctly upon use of such systems.

The requirements in terms of size (especially thickness) of the battery are very strict in mobile devices, particularly in hearing instruments. This has to be set against the operating time, which, in hearing instruments, should amount to at least one day with 16-20 hours, ideally more. In order to retain the size specifications, all parts of the power supply must be attuned as optimally as possible to one another. This relates in particular to the battery itself, since this contributes significantly to the overall size of the power supply and applies equally to rechargeable batteries. This possibly also includes charging and protective circuits.

The article "NTT Docomo's New Smartphone, Charger Can Be Wirelessly Charged" May 17, 2011, Kouji Kariatsumari, Nikkei Electronics (http://techon.nikkeibp.co.jp/english/NEWS_EN/20110517/191823/) and the range of products Jhih hong technology Co Ltd, Wireless Battery Pack &

Charger for iPhone 3G/3GS (http://www.jht-energy.com/style/content/CN-09-2a/product_detail.asp?lang=2&customer_id=2255&name_id=96567&rid=56802&id=318528#iphone3G) discloses wireless rechargeable battery packs. Little is disclosed in terms of the integrated electronic components and operating voltages. The battery packs are relatively large.

SUMMARY OF THE INVENTION

It is accordingly an object of the invention to provide a hearing instrument with a rechargeable battery which overcomes the above-mentioned disadvantages of the heretofore-known devices and methods of this general type and which provides for an optimization in the everyday use of an accumulator battery, in particular by means of an EOL detection, and the performance and service life of an accumulator battery, in particular with sensitive systems such as Li-ion batteries, in a hearing instrument system.

With the foregoing and other objects in view there is provided, in accordance with the invention, a hearing instrument system, comprising:

a hearing instrument having an energy transfer interface and a communication interface;

an accumulator system having an accumulator, an energy transfer interface, a communication interface and an accumulator control facility; and a charging system having an energy transfer interface, a communication interface and a charge control facility;

wherein said energy transfer interface of said accumulator system is configured to establish an energy transfer link with said energy transfer interface of said hearing instrument for supplying energy stored in said accumulator to said hearing instrument as a constant voltage or a regulated constant voltage (i.e., a closed-loop controlled constant voltage), and to establish an energy transfer link with said energy transfer interface of said charging system;

wherein said communication interface of said accumulator system is configured to establish a communication link with said communication interface of said hearing instrument and with said communication interface of said charging system;

wherein said accumulator system is configured to transfer an item of information relating to the accumulator and generated by said accumulator control facility to one or both of said hearing instrument or said charging system by way of the respective said communication link; and said accumulator system is configured to transfer an item of state of charge information dependent on a state of charge of said accumulator and determined by said accumulator control facility to said hearing instrument by varying the regulated constant voltage of the supplied energy.

A basic idea behind the invention consists in documenting information in respect of the accumulator, for instance accumulator capacity, state of charge, events during the use of the accumulator during everyday operation, service life and charging cycles. The information is to be made suitably available, for instance during operation and while the accumulator is being charged. Important usage information during operation, e.g. the occurrence of faults, is stored in the hearing instrument and passed to the charging device or hearing instrument adjustment software. In response to such information, hearing instrument parameters can be adjusted to the state of the accumulator.

In other words, the invention achieves the objects by way of a hearing instrument system, a hearing instrument, an accumulator system and a charging system having the features of the subordinate claims.

A basic idea behind the invention consists in a hearing instrument system, comprising a hearing instrument, the hearing instrument including an energy transfer interface and a communication interface, an accumulator system, the accumulator system including an accumulator, an energy transfer interface, a communication interface and an accumulator control facility, and a charging system, the charging system including an energy transfer interface, a communication interface and a charge control facility.

The energy transfer interface and communication interface on the accumulator side can establish an energy transfer link and/or communication link with the energy transmitter interface and communication interface on the charger and hearing instrument side. The accumulator system makes energy stored in the accumulator available to the hearing instrument by way of the corresponding energy transfer link and passes an item of state of charge information dependent on the state of charge of the accumulator and generated by the accumulator control facility to the hearing instrument via the corresponding communication link.

The communication links provided in addition to the energy transfer links between accumulator system, charging system and hearing instrument enable all operating parameters and usage information in respect of the accumulator to be continuously monitored, stored and evaluated, by the accumulator system transferring such data to the charging system or hearing instrument. Delicate operating parameters of sensitive accumulators, for instance Li-ion accumulators can be monitored and controlled in this way in order thus to optimize the use of such accumulators and the contact and thus to increase the service life, battery capacity, reliability and everyday use. In particular, a reliable state of charge detection for instance in respect of the EOL detection is made possible by means of the hearing instrument by transferring the state of charge information even for batteries of which the state of charge is not readily identifiable by way of its voltage. These may be accumulator systems in particular, which make available a voltage that is regulated (i.e., closed-loop controlled) to a constant voltage value. This is the case for instance in Li-ion accumulators in hearing instruments, the voltage of 3.7 volts of which is down-transformed to the 1.2 volts which is usual for hearing instruments.

A further advantageous embodiment consists in the energy transfer link between the accumulator system and the hearing instrument also being embodied as a communication link. The already existing energy transfer link can thus experience an additional use for communication purposes, which amounts to reducing the number of separate links and/or interfaces and thus to reducing the installation size.

A further advantageous embodiment consists in the accumulator system providing a supply voltage for the hearing instrument by way of the energy transfer and communication link and in the accumulator system transferring the state of charge information by setting the supply voltage to a predetermined value. It is particularly possible in this way to make the state of charge of the battery via the voltage even in an accumulator system having a regulated output voltage, for instance a 3.7 volt Li-ion battery with an output voltage regulated to 1.2 volts. Since the state of conventional batteries is identified in hearing instruments with the aid of the battery voltage, with a suitable selection of the predetermined voltage, the EOL detection of the hearing instrument which is attuned to conventional battery types can also be used for accumulators. In other words, the EOL voltage curve of a conventional battery can be simulated by means of a suitable selection of the predetermined voltage of the accumulator system.

A further advantageous embodiment consists in the accumulator system making available a supply voltage for the hearing instrument by way of the energy transfer and communication link and in the accumulator system transferring the state of charge information to the supply voltage by modulating a predetermined signal. It is therefore possible to make a (regulated) constant supply voltage available to the hearing instrument, which is optimal for its operation. The state of charge information can still simultaneously be transferred in order to enable EOL detection for instance. During modulation, a high transmission bandwidth is available, so that more comprehensive information relating to the state of charge of the accumulator can be transmitted, as is the case with conventional EOL detection.

A further advantageous embodiment consists in the accumulator system transferring an item of accumulator information determined by the accumulator control facility to the hearing instrument and/or the charging system by way of the corresponding communication link in respect of one or a number of the following accumulator parameters:

number of effected charging cycles
duration of a charging process
temperature of a charging process
total discharge of the accumulator
connecting the accumulator with polarity reversal
fault in a charging process, in particular in respect of voltage, current or temperature,
State of Health
impedance of the accumulator
charge quantity
remaining capacity
overall capacity
type of accumulator, for instance relating to accumulator chemistry, serial number, other production information.

Accumulator information relating to properties in respect of an accumulator and/or a rechargeable cell convey in-formation relating to their state of health (SoH) and state of condition (SoC) which is essential for practical use. Most of the accumulator information is individual to the respective accumulator type. Contexts and processes in everyday use are also important here. For instance, accumulator discharges vary from short, minimal current drains, for instance for a telephone, through intermittent, high current drains, e.g. for electronic tools, to long-duration, uniform current consumption, e.g. for hearing instruments. An important item of accumulator information is for instance the internal resistance (apparent impedance), which produces a to some degree precise indication of the accumulator state. The internal resistance is significantly influenced by the measuring time point (before or after charging/discharging) and the temperature.

Therefore the parameters essential to the operation of a accumulator are optionally available in the hearing instrument and in the charging system. The everyday use of the accumulator can thus be monitored in the hearing instrument and a usage history can be stored, which can then be read out for adjustment and optimization purposes.

A further advantageous embodiment consists in the energy transfer interface and the communication interface of the accumulator system consisting of the same, preferably two, electrical contacts. The information to be transmitted can then be modulated for instance on the energy transfer signal which is made available, usually a supply voltage. The already existing energy transfer link can thus experience an additional use for communication purposes, which contributes to reducing the number of separate links and/or interfaces and thus to reducing the installation size.

A further advantageous embodiment consists in the energy transfer interface of the accumulator system preferably consisting of two electrical contacts, and in the communication interface of the accumulator system including at least one further electrical contact. The use of an additional contact for transmitting information extends the possible communication bandwidth significantly and consequently enables a more intensive and complete monitoring of the accumulator.

A further advantageous embodiment consists in the energy transfer link between the accumulator system and the hearing system consisting of preferably two, electrical contacts, and in the energy transfer link and/or the communication link between the accumulator system and the charging system being wireless. While the wireless transmission within the hearing instrument uses too much energy and at the same time is not even necessary, it is in turn desirable for the link with the charging system. The wireless link with the charging system allows external interfaces of the hearing instrument and the accumulator system inserted therein to be dispensed with. This contributes to reducing the installation size. At the same time, a tighter seal with respect to penetration of moisture and dirt is achieved.

Other features which are considered as characteristic for the invention are set forth in the appended claims.

Although the invention is illustrated and described herein as embodied in a hearing instrument system having a rechargeable battery, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
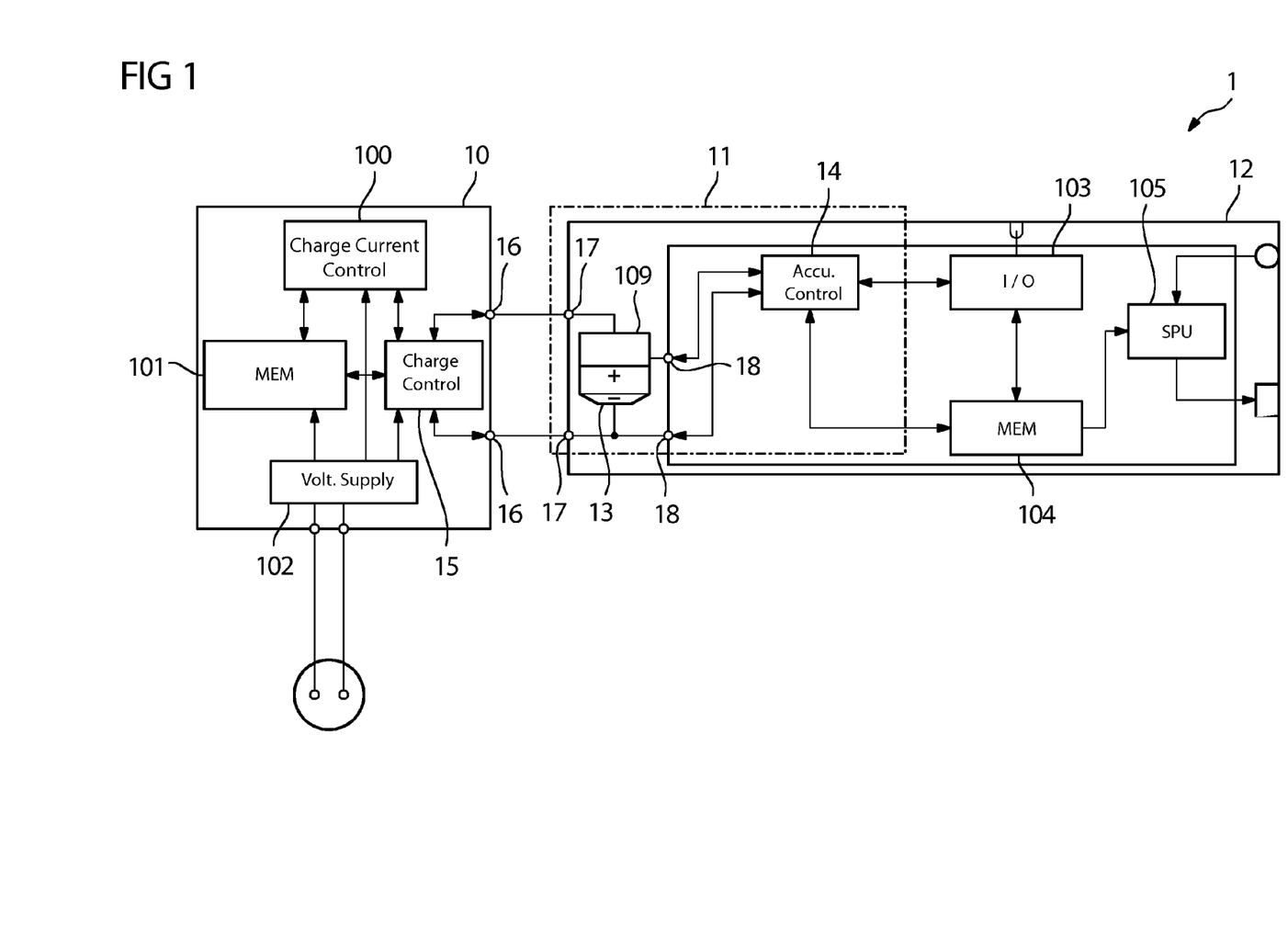
FIG. 1 is a diagrammatic illustration of a hearing instrument system with a charge current controller in the accumulator.

Referring now to the figures of the drawing in detail and first, particularly, to FIG. 1 thereof, there is shown a schematic representation of a hearing instrument system 1 with a charge current controller 109 in the accumulator 13. The hearing instrument system includes a charging system 10, an accumulator system 11, and a hearing instrument 12. The accumulator system 11 has a dashed outline and consists of several components, which can be arranged differently. On the one hand, the accumulator system 11, including all its components, can be embodied as a stand-alone module (accumulator pack) and can be advantageously encapsulated for protection against dirt and moisture. On the other hand, the components can be partially integrated in the hearing instrument 12 and partially in the accumulator 13. The embodiment shown in the figure comprises at least one charge current controller 109 integrated in the accumulator 13.

The terms control, controlled and controller as used herein should be understood as referring to closed-loop control, which is also referred to as regulate or regulator, unless the context otherwise dictates the understanding of an open control.

The charge current controller 109 is adjusted individually to the type of accumulator being used and ensures basic, accumulator-specific functions such as overload protection, protection against total discharge, overload protection, protection against charging or commissioning with polarity reversal (reverse polarity protection) and charge current control and trickle charge control. Depending on the accumulator type used, some of these functions, all or even further functions, can be perceived by the charge current controller 109. Depending on the design of the charge current controller 109, this can be adjusted to different accumulator types, for instance by differently parameterized operating software or firmware.

The accumulator 13 makes energy available for operation of the hearing instrument 12. This is made available by way of the accumulator system contacts 17 at the hearing instrument contacts 18. In addition, this can transfer information which relates to the accumulator itself, via the same contacts, to the hearing instrument 12. It is apparent that the same two contacts 17 or 18 are used to transmit energy and data, so that they represent a mutually integrated energy transfer link and communication link.

The information transmitted from the accumulator 13 is received in the hearing instrument 12 by the accumulator control facility 14. If necessary, the accumulator control facility 14 can conversely perform adjustments to operating parameters, by transferring corresponding programs, program parameters or settings via the communication and energy transfer link to the accumulator 13 and/or the charge current controller 109. The accumulator control facility 14 forms the accumulator system 11 together with the accumulator 13 and the charge current controller 109.

On the part of the hearing instrument 12, in which parts of the accumulator system 11 can be integrated, predominantly for instance the accumulator control facility 14, data can be exchanged with the accumulator control facility 14 by way of the programmer interface 103. The programmer interface 103 is also used to adjust operating parameters of the hearing instrument 12 and to copy across software or firmware updates. Data can accordingly also be input into the accumulator system 11 or read out therefrom by way of the programmer interface 103. Furthermore, a memory (MEM) 104 is connected to the programmer interface (I/O) 103, which is used on the one hand as operating data and software memory for the hearing instrument 12 and can be stored in the log data of the accumulator system 11 on the other hand. With the aid of this log data of the accumulator system 1, a history of accumulator usage and a fault monitoring can take place for analysis and adjustment purposes.

Further components of the hearing instrument 12 are a signal processing facility or signal processing unit (SPU) 105, which is connected to a microphone and a loudspeaker (also referred to as receiver).

A charging system 10 which is separated from the hearing instrument 12 and the accumulator system 11 are connected to the accumulator system 11 and the hearing instrument 12 by way of charging system contacts 16. The charging system 10 makes a charge current available to the accumulator 12 on the one hand by way of the charging system contacts 16. On the other hand, data is also exchanged by way of the same two contacts 16, so that a mutual integration of energy transfer link and communication link is also provided in respect of the link with the charging system 10. A pair of external connections to the hearing instrument 12 is preferably provided in the actual embodiment, said pair of external connections simultaneously enabling the connection of the charging system 10 both with the accumulator system 11 and also with the hearing instrument 12. The number of required electrical contacts is minimized overall in this way.

The charging system 10 includes a charge control facility 15 which controls the charging system 10. A charge control controller 10 ensures a controlled, i.e., closed-loop controlled, charge current for the accumulator 13, wherein the previously described basic charge regulating functions are available. In this respect, functions in the charge current controller 109 and in the charge current controller 100 can be provided redundantly. Aside from a voltage supply 102, the charging system 10 further includes a memory 101. The memory 101 is used on the one hand to store operating parameters, software and/or firmware of the charging system 10. On the other hand, data received in the memory 101 from the accumulator system 11 and/or from the hearing instrument 12 relating to the accumulator 13, for instance log data or status information, can be stored. A history of the accumulator usage is made available to the charging system 10 in this way, which enables an individual adjustment of the behavior and the functions of the charging system 10 to the respective accumulator 13.

The schematically explained hearing instrument enables the high demands to be satisfied, to provide the batteries, in particular sensitive accumulator types such as Li-ion accumulators, for everyday use and recharge so as to be able to optimally operate in respect of service life, reliability and charging capacity. In particular, the charging capacity and service life (above all the achievable number of charging cycles) depends on the quality and control of the charging system. A continuous communication between the charging system 10, accumulator system 11 and hearing instrument 12 is enabled on this account in the hearing instrument system 1. Data can be exchanged arbitrarily between the individual components. The data may in particular be:

- number of charging cycles
- dwell time of the accumulator 13 and/or hearing instrument 12 in the charging system 10
- duration between charging cycles
- duration of the charging cycles
- temperature during the charging process
- remaining capacity and/or charge in the accumulator
- information in respect of occurring faults, e.g. total discharge, polarity reversal, voltage current or temperature fault in the charging system 10
- version of the firmware or software
- data of manufacture
- design characters cleaning or maintenance interval successful or unsuccessful system self-checks of the charging system 10 status information of the hearing instrument 12, such as type, manufacturer, serial number, program data etc.

Further data and information, which can be exchanged in particular between the hearing instrument 12 and an adjustment software, e.g. with the dealer and/or acoustician, are:

exchange or replacement of the accumulator (the counter can be restarted in the charging system)

type and manufacturer of the accumulator (so as to optimize the charge current regulation and charge current parameters for the special accumulator type or copy across new charging parameters in respect of a new accumulator chemistry of a new accumulator type)

data for the user to remember to check the rechargeable battery status update the firmware or software of the charging system 10, which can if necessary also be stored in the memory 104 of the hearing instrument 12, if necessary including an update flag confirmation of maintenance or check by the acoustician, which may if necessary delete all counters in the charging system 10 for the individual hearing instrument 12, all counters, which were previously mentioned, and which could help the acoustician provide the user of the hearing instrument 12 with information and advice for an optimal usage in order in particular to maximize the accumulator service life additionally, the acoustician can set or delete signal and settings in the hearing instrument 12, for instance in order to check the accumulator 13 or to replace the same if the remaining accumulator capacity reduces during the service life of the accumulator 13. The data exchange between the charging system 10 and hearing instrument 12 also enables an improved estimation of the possible operating duration of the hearing instrument 12 with the charge capacity made available by the accumulator 13.

During everyday operation, the hearing instrument 12 can also inform the user, for instance via an external remote control or acoustic signals, about:

the state of charge of the accumulator 13 (e.g. fully charged or partly charged)

the remaining accumulator charge and estimated operating duration until the next charge, the number of already effected charging cycles estimation of still possible charging cycles and duration until the accumulator 13 has to be replaced.

This information can be provided automatically for instance when starting the hearing instrument 12, after predetermined time intervals, or upon call up by the user.

Figure 2:
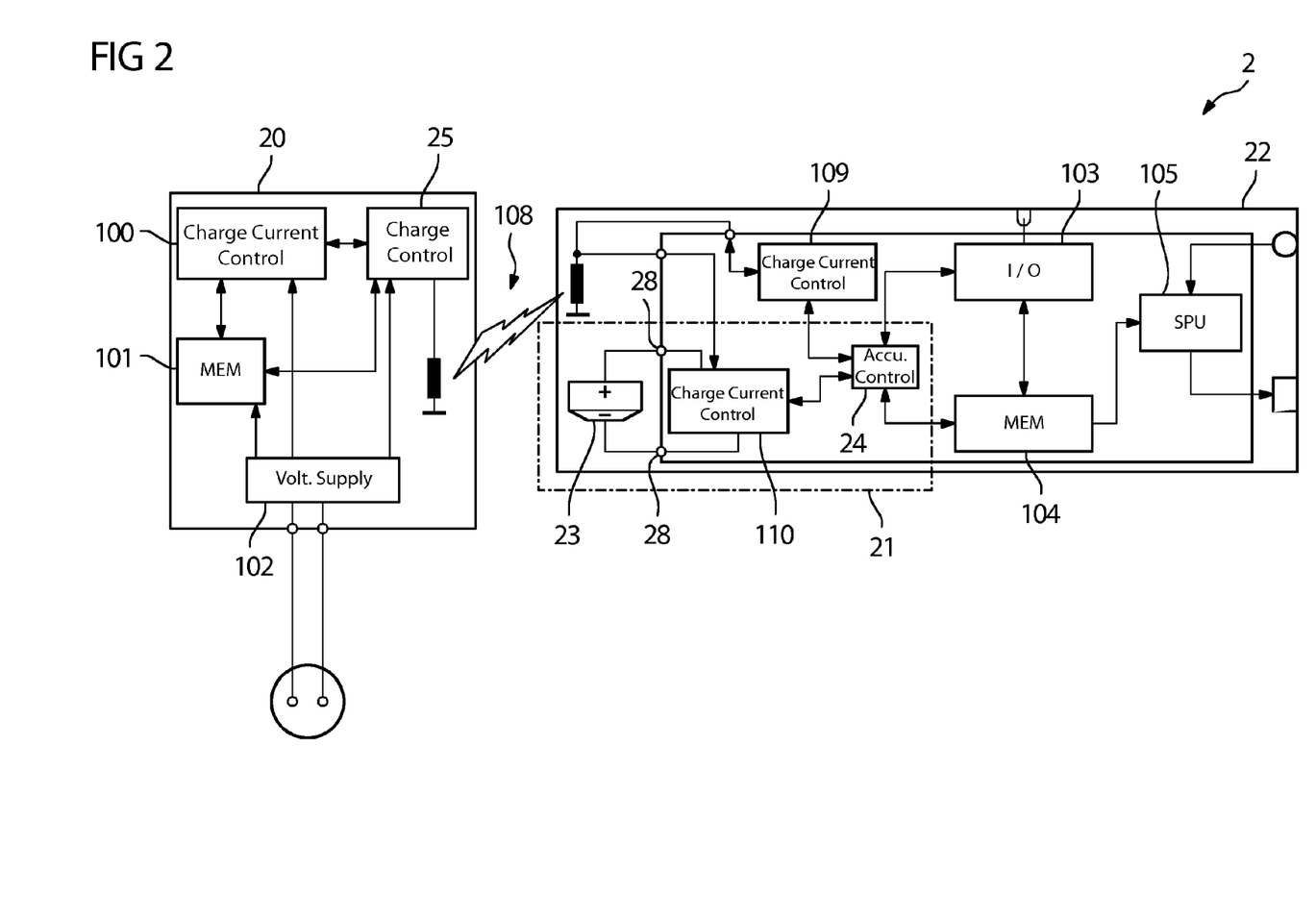
FIG. 2 is a similar view of a hearing instrument system with a wireless charging system link.

FIG. 2 shows a hearing instrument system 1 with a similar structure as explained previously. The hearing instrument system 2 includes a charging system 20, a hearing instrument 22 and an accumulator system 21. The hearing instrument system 2 differs above all on account of the wireless link of the charging system 20 from the preceding explanations, furthermore no charge current closed-loop control is integrated in the accumulator 13. Instead, a charge current regulation 110 with a comparable functionality is disposed in the hearing instrument 22.

The charging system 20 communicates with the hearing instrument 22 and/or accumulator system 21 by way of a wireless communication and energy transfer link 108. The charge current controller 25 is in particular adjusted to the requirements of wireless energy and data communication and usually has similar functionalities to those explained above.

The accumulator 23 and/or the accumulator system 21 is connected to the hearing instrument 22 by way of electrical hearing instrument contacts 28, and makes the energy supply for the hearing instrument 22 available via these two contacts 28. Furthermore, the two contacts 28 also represent the communication link between the accumulator system 21 and the hearing instrument 22, which is mutually integrated with the energy transfer link. For communication with the charging system 20, the accumulator system 21 uses the same wireless link 108 as the hearing instrument 22.

The accumulator system 21 includes a charge current controller 110, which is adjusted in particular to receiving wirelessly transmitted energy from the charging system 20. In respect of further functions and components, reference is made to the preceding description of the figures.

Figure 3:
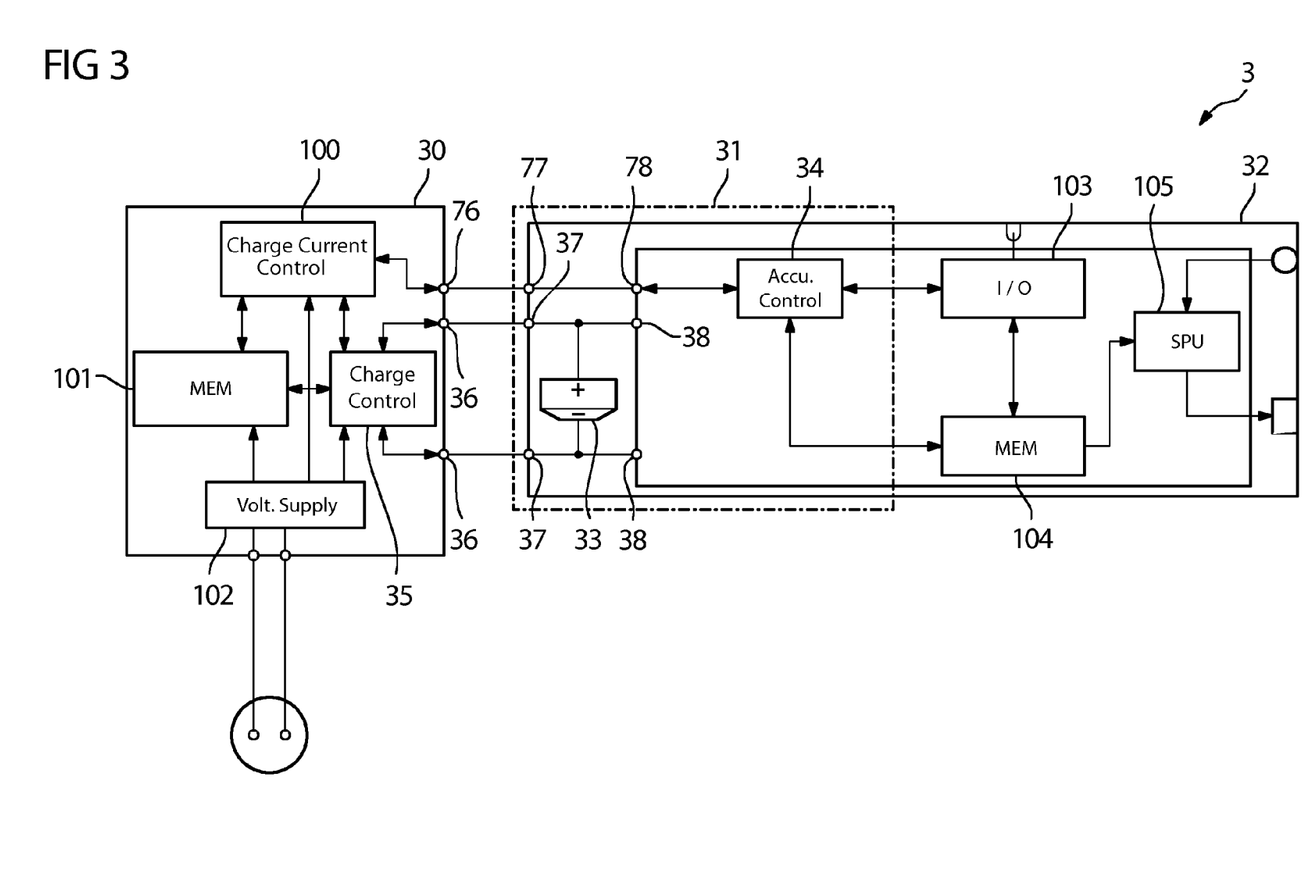
FIG. 3 is a similar view of a hearing instrument system with an additional communication contact.

FIG. 3 shows a schematic representation of a hearing instrument system 3 with an additional communication contact 37. The hearing instrument system 3 includes a charging system 30 with charge current controller 35, which provide a charge current for the accumulator 33 in the accumulator system 21 by way of charging system contacts 36. An additional charging system contact 76 is used to transmit information. The accumulator system 31 receives energy made available by the charging system 30 via the accumulator system contacts 37. An additional accumulator system contact 77 is used to transmit data.

The two contact pairs 36 and 37 thus represent the energy transfer link between the charging system 30 and the accumulator system 31 and/or hearing instrument 32, while the communication link is based at least on the additional contact pair 77, 76. In other words, the two charging system contacts 36 form the energy transfer interface of the charging system 30, while the two accumulator system contacts 37 represent the energy transfer interface of the accumulator system 31. Corresponding hearing instrument contacts 38 form the energy transfer interface of the hearing instrument 32. The communication interface of the charging system 30 includes at least the charging system contact, the communication interface of the accumulator system 31 includes at least the contact 77 and the communication interface of the hearing instrument 32 includes at least the hearing instrument contact 78.

The accumulator system 31 includes an accumulator control facility 34, which is adjusted to the individual interface configuration with an at least partially separated energy transfer link and communication link.

With respect to the further functionalities and components, reference is made to the preceding description of the figures.

Figure 4:
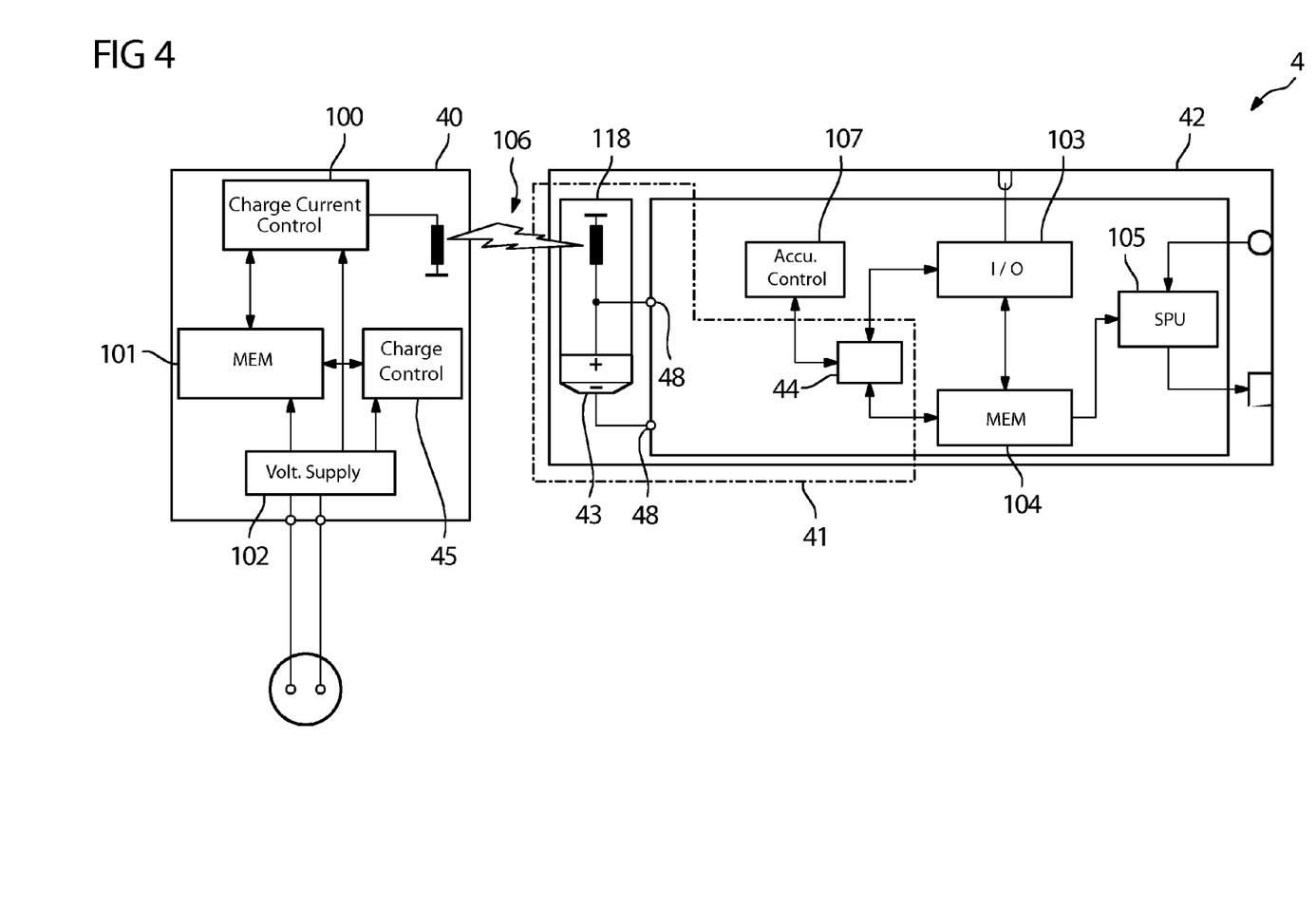
FIG. 4 is a similar view of a hearing instrument system with a wireless communication link.

FIG. 4 shows a schematic representation of a hearing instrument system 4 having a wireless communication link 106. It includes a charging system 40 with functionality adjusted to the special communication configuration, an accumulator system 41 and a hearing instrument 42 with a similarly individually adjusted accumulator control facility 107. An accumulator pack is arranged in the accumulator system 41, which includes an accumulator 43 and an interface circuit 118 integrated in the accumulator 43.

The interface circuit 118 includes a charge current controller, which, as above in respect of the function of the integrated charge current controller 118, is referred to the preceding description. Furthermore, the charge current controller 118, which, as described above, is adjusted individually to the accumulator type used and ensures basic accumulator-specific functions, such as overload protection, protection against total discharge, overload protection, protection against charging or commissioning with polarity reversal (reverse accumulator protection) and charge current regulation and trickle charge regulation). Depending on the design of the charge current controller, this can be adjusted to various accumulator types, for instance by means of operating software or firmware which is parameterized differently. The voltage of the accumulator 43 can be transformed to a required supply voltage of the hearing instrument by means of the interface circuit 118. It can convey data relating to the accumulator 43, in particular information relating to the state of charge.

The energy transfer link is ensured by the wireless link 107, the respective transmitter of which consequently forms the energy transfer interface. The communication link for transferring data from and to the accumulator pack is likewise formed by the wireless link 106, the respective transmitter of which consequently forms the respective communication interface.

Reference is made to the preceding description of the figures in respect of the further functionalities and components.

Figure 5:
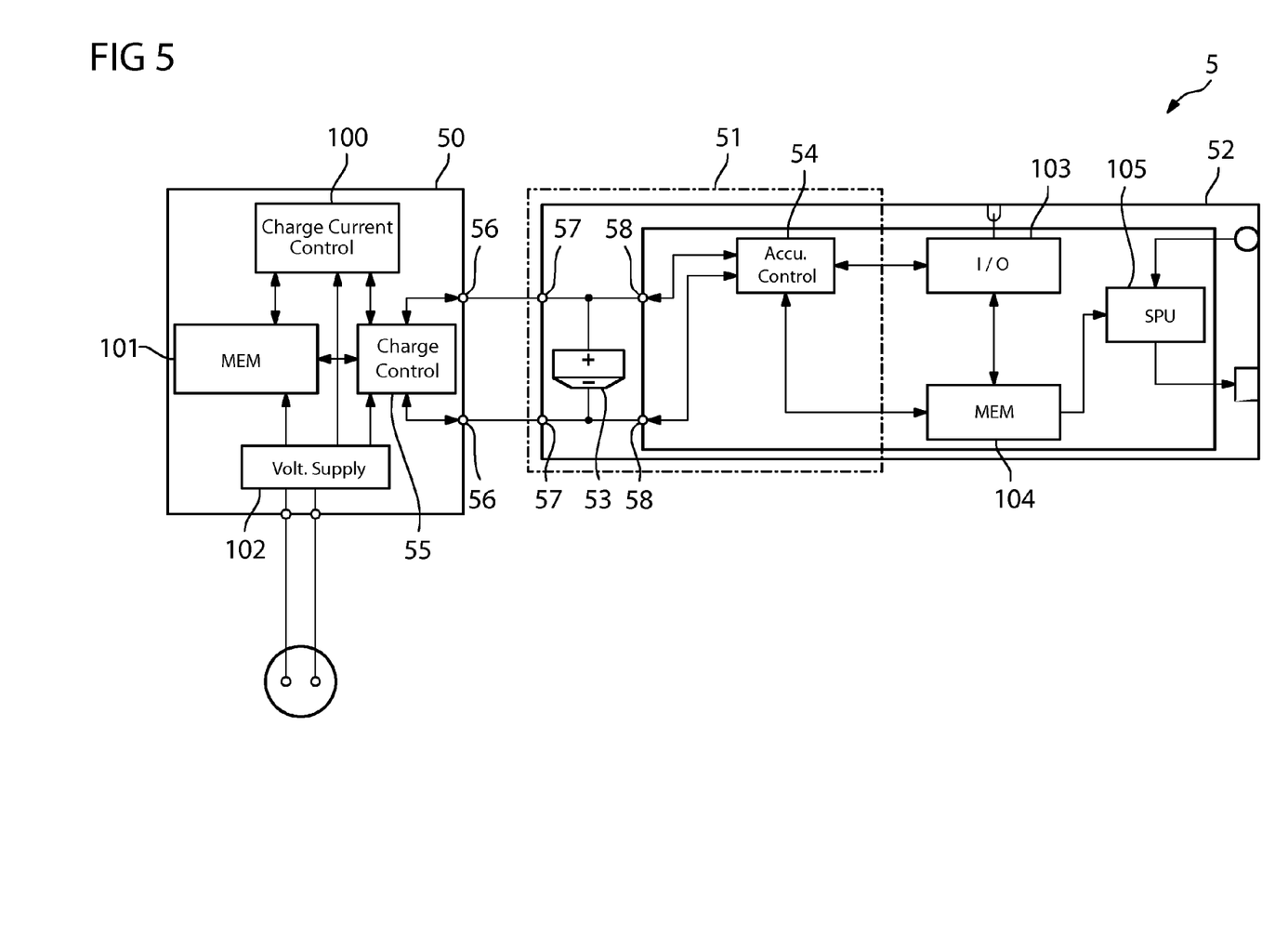
FIG. 5 is a similar view of a hearing instrument system with a hearing instrument without a charge current controller.

FIG. 5 shows a hearing instrument system 5 having a hearing instrument 52 without its own charge current controller. It includes a charging system 50, a charge control facility 55 and the charging system contacts 56, which form the energy transfer and communication interface of the charging system 50.

Accumulator system contacts 57 and hearing instrument contacts 58 form the respective energy transfer interface and communication interface of the accumulator system 51 and hearing instrument 52. Neither the accumulator system 51 nor the hearing instrument 52 has its own charge current controller. Charging of the accumulator 53 with an optimized charge current and charging parameters is thus exclusively possible by means of the charging system 50. The accumulator control facility 45 is adjusted accordingly to the energy transfer and communication requirements in the event of faults in the charge current controller on the hearing instrument or accumulator side.

Reference is made to the preceding description of the figures in respect of the further functionalities and components.

Figure 6:
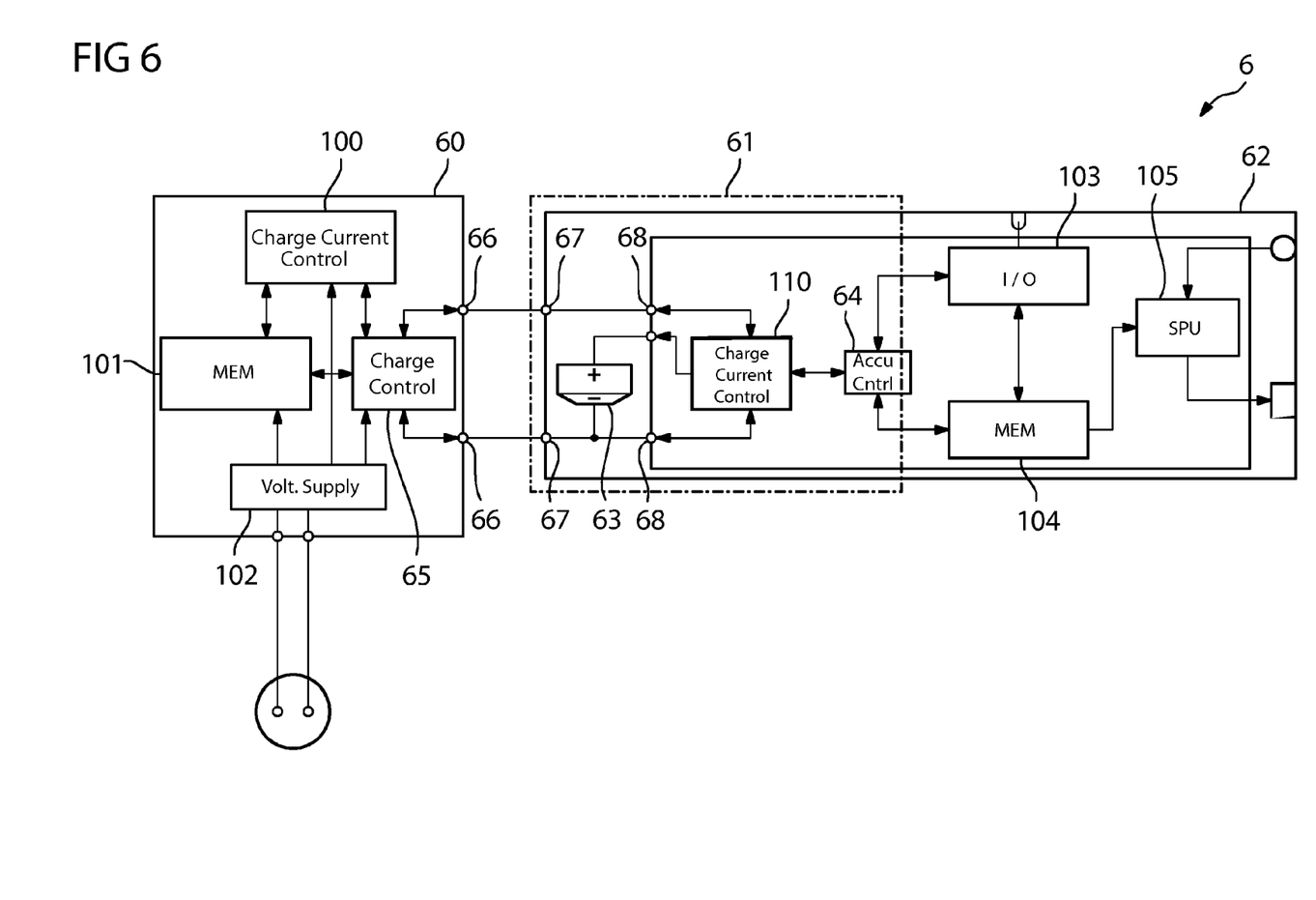
FIG. 6 is a similar view of a hearing instrument system with a charge current controller in the hearing instrument.

FIG. 6 shows a hearing instrument system 6 with a charge current controller 110 in the hearing instrument 62. The hearing instrument system 6 includes a charging system 60 with charge control facility 65 and charging system contacts 66, as well as a accumulator system 61 with accumulator system contacts 67 and accumulator 63 and charge current controller 110 and accumulator control facility 64. Parts of the accumulator system 61 can be integrated in the hearing instrument 62, in particular the charge current controller 110.

In respect of further functionalities and components, reference is made to the preceding description of the figures.

Figure 7:
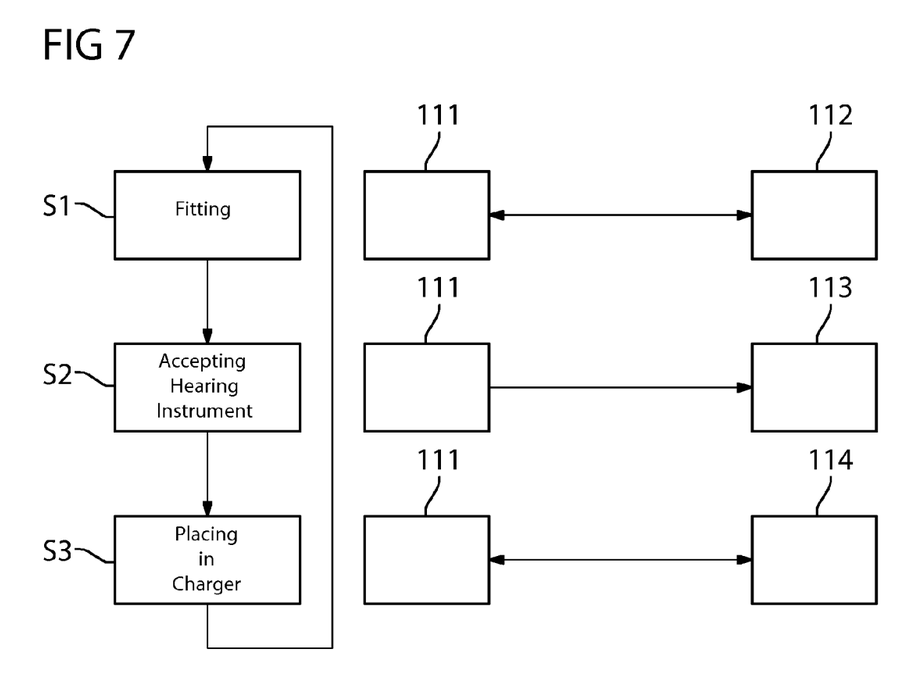
FIG. 7 shows a schematic and flow chart of the mode of operation of the hearing instrument system according to the invention.

FIG. 7 shows a schematic representation of the method of operation of the hearing instrument system explained above. In step S1, a hearing instrument 111 is adjusted at the acousticians to the user (fitting), wherein the hearing instrument 11 has an accumulator. The acoustician enters data relating to the fitting session into the fitting software. This also includes information relating to the accumulator system, e.g. charging system, accumulator type, state of the accumulator etc. The fitting data is recorded by the programmer 112 and transmitted into the hearing instrument 111.

In step S2, the user accepts the hearing instrument 111 and installs accessories, for instance the charging system or a wireless connection of audio and video and telephone, via the user interface 113 of the hearing instrument 111.

In step S3, the user, after removing the hearing instrument 111, places the latter into the charging system 114. The charging system 114 firstly produces the energy transfer and communication link with the hearing instrument 111. Here all counters in the charging system 114 and in the hearing system 111 are reset, similarly possible data recordings in respect of the preceding use of other accumulators. The hearing instrument 111 and/or the accumulator is charged and increased to one after a successful charging of the charging cycle counter.

Should the accumulator have been totally discharged during everyday use, e.g. because it was inadvertently not charged long enough, the fault count for total discharges is increased by 1. The same applies to the polarity reversal when connecting the accumulator, or to other faults.

During the next check-up of the hearing instrument 111 by the acoustician, the fitting software with the programmer 113 reads all the stored information from the hearing instrument 11 and makes it available to the acoustician. The acoustician may respond to the received information, e.g. by additional explanation for the user, or by asking questions with respect to everyday use. In particular, the acoustician can check the charging capacity of the accumulator and the remaining service life charging cycles and propose a replacement of the accumulator for instance. In the event of the replacement, the old accumulator can be sent to the manufacturer together with the recorded data, in order for instance to enable guarantee claims or on the part of the manufacturer to provide data so as to improve and further develop the accumulator system.

Figure 8:
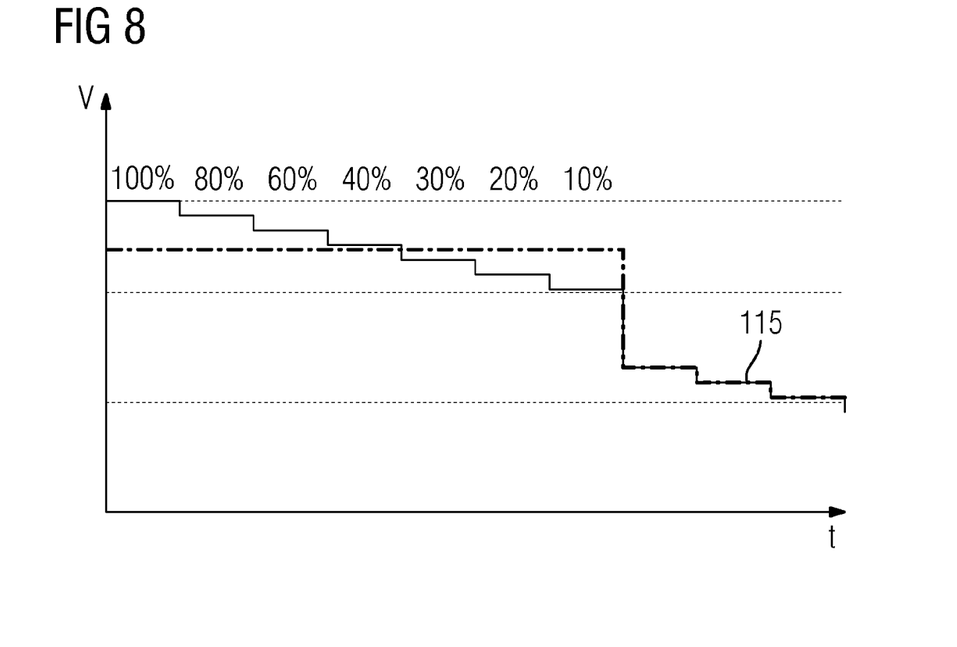
FIG. 8 is a chart graphing a closed-loop controlled (regulated) supply voltage for EOL detection.

FIG. 8 shows a schematic representation of a supply voltage (V) closed-loop controlled (i.e., regulated) by the accumulator system over time (t), which enables an EOL detection (End of Life). The energy stored in the accumulator is made available as a closed-loop controlled supply voltage, wherein the supply voltage is basically controlled to a constant value in order to optimally satisfy the requirements of the hearing instrument. In order however to enable the EOL detection, which the user is to monitor prior to the imminent discharge of the accumulator, the regulated voltage (V) can be reduced in a number of steps, wherein each reduced voltage corresponds to a specifically reduced state of charge of the accumulator. The reduced state of charge is specified in percentages in the figure by way of example, wherein the imminent accumulator exhaustion is indicated by the raised voltage drop in the second half of the curve (EOL display). In this way the hearing instrument can identify the supply voltage made available by the accumulator, which is the current state of charge of the accumulator.

Figure 9:
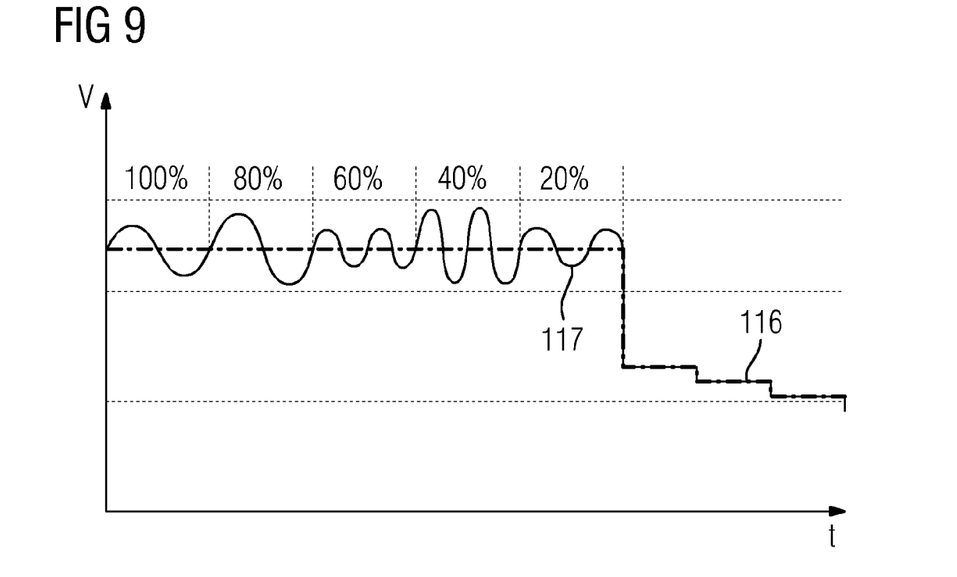
FIG. 9 is a chart of a modulated supply voltage for EOL detection.

FIG. 9 likewise schematically shows a supply voltage (V) modulated by the accumulator system over time (t), which enables an EOL detection. The energy made available by the accumulator is provided in the form of a regulated supply voltage (V). The supply voltage is in this way constant. In order to make information available about the state of charge of the accumulator, a signal is modulated onto the regulated supply voltage. The reduced state of charge is specified in percentages in the figure for instance. Here different predetermined modulations can be used, which indicate the different states of charge of the accumulator. The imminent accumulator exhaustion is shown in the second half of the curve by the drop in voltage (EOL display). In this way, a power supply which is regulated to a constant supply is available on the one hand with the exception of the EOL region, on the other hand an EOL detection can nonetheless be implemented by the hearing instrument.

The method explained with reference to FIG. 8 and FIG. 9 for EOL detection of the supply voltage in particular enables the state of charge of the accumulator to be transmitted via the energy transfer interface and/or energy transfer link between the accumulator system and the hearing instrument. In this respect, a minimal number of contacts is sufficient to realize the two interfaces. The energy transfer interface is namely used simultaneously as the communication interface.

A basic concept underlying the invention may be summarized as follows: The invention relates to a hearing instrument system having a rechargeable battery, or accumulator. The object of the invention consists in optimizing the everyday use of an accumulator, in particular by means of EOL detection, and the performance and service life of an accumulator, in particular with sensitive systems such as Li-ion accumulator, in a hearing instrument system. A basic idea of the invention consists in a hearing instrument system 1,2,3,4,5,6 including a hearing instrument 12,22,32,42,52,62 with energy transfer interface and communication interface, a accumulator system 11,21,31,41,51,61, the accumulator system 11,21,31,41,51,61 with accumulator 13,23,33,43,53,63, energy transfer inter-face, communication interface and charge control facility 14,24,34,44,54,64, and a charging system 10,20,30,40,50,60, with energy transfer interface, communication interface and charge control facility 15,25,35,45, 55,65. The energy transfer interface and communication interface on the accumulator side can produce an energy transfer link and/or communication link on the charge side and hearing instrument side, wherein the accumulator system 11,21,31,41,51,61 makes energy stored in the accumulator 13,23,33,43,53,63 available to the hearing instrument 12,22, 32,42,52,62 by way of the corresponding energy transfer link and transfers state of charge information generated by the accumulator control facility 14,24,34,44,54,64 to the hearing instrument 12,22,32,42,52,62 by way of the respective communication link. By transmitting the state of charge information, a reliable state of charge detection for instance in respect of the EOL detection by the hearing instrument is also enabled in batteries whose state of charge cannot be identified at its voltage, for instance Li-ion systems with closed-loop controlled voltage.

The invention claimed is:

1. A hearing instrument system, comprising:
    a hearing instrument having an energy transfer interface and a communication interface;
    an accumulator system having an accumulator, an energy transfer interface, a communication interface and an accumulator control facility; and
    a charging system having an energy transfer interface, a communication interface and a charge control facility;
    wherein said energy transfer interface of said accumulator system is configured to establish an energy transfer link with said energy transfer interface of said hearing instrument for supplying energy stored in said accumulator to said hearing instrument as a constant voltage, wherein said energy transfer link between said accumulator system and said energy transfer interface of said hearing instrument is also embodied as a communication link for transferring data;
    wherein said energy transfer interface of said accumulator system is also configured to establish an energy transfer link with said energy transfer interface of said charging system;
    wherein said energy transfer interface of said accumulator system is configured to establish an energy transfer link with said energy transfer interface of said hearing instrument for supplying energy stored in said accumulator to said hearing instrument as a constant voltage, and to establish an energy transfer link with said energy transfer interface of said charging system;
    wherein said communication interface of said accumulator system is configured to establish a communication link with said communication interface of said hearing instrument and with said communication interface of said charging system;
    wherein said accumulator system is configured to transfer an item of information relating to the accumulator and generated by said accumulator control facility to one or both of said hearing instrument or said charging system by way of the respective said communication link; and
    said accumulator system is configured to transfer an item of state of charge information dependent on a state of charge of said accumulator and determined by said accumulator control facility to said hearing instrument by varying the constant voltage of the energy supply;
    wherein said accumulator system is configured to provide a supply voltage to said hearing instrument by way of the energy transfer and communication link and said accumulator system transmits the state of charge information by setting the supply voltage to a predetermined value.

2. The hearing instrument system according to claim 1, wherein said accumulator system is configured to provide a supply voltage to said hearing instrument by way of the energy transfer and communication link and said accumulator system transmits the state of charge information by modulating a predetermined signal on the supply voltage.

3. The hearing instrument system according to claim 1, wherein said accumulator system is configured to transfer an item of accumulator information determined by said accumulator control facility by way of the corresponding said communication link to said hearing instrument and/or said charging system.

4. The hearing instrument system according to claim 3, wherein item of accumulator information determined by said accumulator control facility is one or a plurality of accumulator parameters selected from the group consisting of:
    a number of effected charging cycles;
    a duration of a charging process;
    a temperature of a charging process;
    a total discharge;
    a connection with polarity reversal;
    a fault in a charging process;
    a State of Health;
    an impedance of the accumulator;
    a charge quantity;
    a residual capacity;
    an overall capacity; and
    a type of accumulator.

5. The hearing instrument system according to claim 4, wherein the fault in the charging process pertains to voltage, current, or temperature, and the parameter relating to the type of accumulator pertains to accumulator chemistry, serial number, or other production information.

6. The hearing instrument system according to claim 1, wherein said energy transfer interface and said communication interface of said accumulator system consist of the same electrical contacts.

7. The hearing instrument system according to claim 6, wherein said energy transfer interface and said communication interface of said accumulator system consist of two electrical contacts.

8. The hearing instrument system according to claim 1, wherein said energy transfer interface of said accumulator system comprises two electrical contacts, and said communication interface of said accumulator system comprises at least one further electrical contact.

9. The hearing instrument system according to claim 1, wherein said energy transfer link between said accumulator system and said hearing instrument comprises electrical contacts and said energy transfer link and/or said communication link between said accumulator system and said charging system are wireless.

* * * * *